United States Patent [19]

Wenzel

[11] 4,220,009
[45] Sep. 2, 1980

[54] POWER STATION

[76] Inventor: Joachim O. M. Wenzel, Hauptmannsreute 46, 7 Stuttgart 1, Fed. Rep. of Germany

[21] Appl. No.: 822,982

[22] Filed: Aug. 8, 1977

[30] Foreign Application Priority Data

| Jan. 21, 1977 [DE] | Fed. Rep. of Germany | 2702232 |
| Feb. 17, 1977 [DE] | Fed. Rep. of Germany | 2706702 |
| Mar. 2, 1977 [DE] | Fed. Rep. of Germany | 2709036 |
| Jun. 24, 1977 [DE] | Fed. Rep. of Germany | 2728418 |

[51] Int. Cl.² .................... F01K 25/00; F01K 27/00
[52] U.S. Cl. ........................... 60/648; 62/52; 62/55; 48/191
[58] Field of Search ............... 62/53, 55, 88, 52, 89, 62/402; 60/648; 48/191 XR

[56] References Cited

U.S. PATENT DOCUMENTS

| 2,964,917 | 12/1960 | Webster | 62/53 X |
| 3,154,928 | 11/1964 | Harmens | 62/87 X |

*Primary Examiner*—Allen M. Ostrager
*Attorney, Agent, or Firm*—William A. Drucker

[57] ABSTRACT

A power plant for connection to a main pipe conveying a pressure medium such as natural gas, includes a branch pipe connected to the main pipe, an energy conversion device such as a turbine or a piston pump connected to receive pressure medium from the branch pipe and operable to convert pressure energy of the medium into usable energy, and an intermediate buffer reservoir connected to receive pressure medium from the conversion device and supplying the pressure medium from the reservoir to a load which consumes pressure medium.

15 Claims, 3 Drawing Figures

POWER STATION

BACKGROUND OF THE INVENTION

The present invention relates to power plants.

A power plant is already known in which a turbine is driven by natural gas taken from a gas main, the outflow pipe of the turbine being connected to supply a natural gas consuming load. Back pressure control is provided by means of a bypass in which is located a pressure reducing valve. Furthermore, a regulating valve is provided in the pipe leading to the turbine inlet in order to maintain the natural gas flow supplied to the turbine at a constant pressure. Therefore, the task has been to keep substantially constant the quantity current delivered by the generator, although natural gas consumption is known to fluctuate very considerably. To this end a turbine must be used, whose output corresponds to only the minimum load throughput of the natural gases. However, this means that the turbine must be very small, because in general the minimum throughput is very small. However, in all other cases, a constant power output is not possible (U.S. Pat. No. 1,946,182). Furthermore, in the lower range it is not possible to reduce the pressure in the necessary manner.

The known back pressure regulating devices for alternating current generators, in which the speed is kept constant by a synchronous load network also only operate in a particular range of output fluctuations, whereby they deliver to the load network the greatly varying output. The possibility does not exist of reducing the pressure in the necessary manner, in the lower range.

In addition, air and gas accumulators and reservoirs of various types are known in which the air or gas pressure can be kept constant in the case of a variable accumulator volume by liquid or weight loading (U.S. Pat. No. 3,677,008). A high pressure accumulator can then be connected with the inlet of a turbine in order to convert the stored compressed air into electrical current. This relates to the known peak load power stations which are intended to convert relatively inexpensive night current into day current. However, these accumulators are located several hundred meters below ground level, making them expensive.

Furthermore, above ground low pressure gas accumulators have long been known in which a constant pressure can be maintained in the case of a variable accumulator volume by weight loading. Nowadays, these are used to store natural gas fed in by long pipelines.

BRIEF SUMMARY OF THE INVENTION

It is an object of the invention to provide a power plant of the above-indicated type in which a larger part of the throughput can be converted into usable energy than has hitherto been the case.

A further object of the invention is to level out the quantities of current obtained in an irregular manner and at different times.

Yet a further object of the invention is to permit the current to be supplied at a specific time, independently of the pressure medium consumption, so that inter alia the possibility also exists to supply peak current.

Finally, a further object of the invention is to obtain a constant extraction from the pressure medium-conveying pipe system, so that peak loading of the pressure system is substantially and at least partially prevented.

BRIEF DESCRIPTION OF THE DRAWINGS

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made, if desired, by those skilled in the art without departing from the invention and the scope of the appended claims.

In the drawings:

FIG. 1 shows a power plant having an intermediate buffer reservoir 5 located in a delivery pipe 4.

Figure 1:
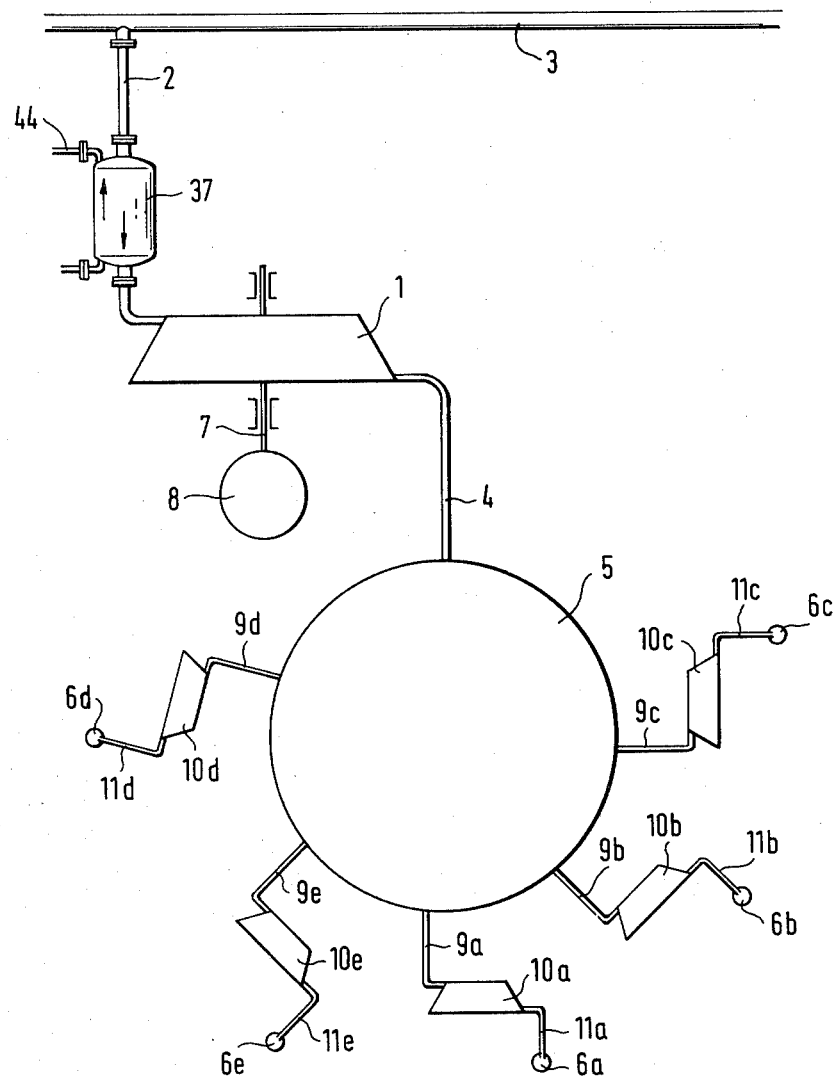
FIG. 1 shows schematically a power plant having an intermediate buffer reservoir.

A pipe 2, which leads via heat exchangers 37 to a turbine 1, branches off from a main pipe 3. Pipe 3 can be e.g. a natural gas grid pipeline under high pressure. However, it is also possible that pipe 3 is a pipe branching off the grid gas pipeline and whose pressure is lower than the latter. The arrangement described hereinafter can also be duplicated.

The pressure medium is relieved to the desired pressure by turbine 1 and is passed by delivery pipe 4 into intermediate reservoir 5, which can e.g. have a variable volume with constant pressure. A plurality of extracting pipes 9a–9e lead from reservoir 5 to loads 6a–6e, with the interpositioning of a further pressure reducing turbine 10a–10e. Although pipes 9a–9e only carry the pressure produced by reservoir 5, it is generally necessary in the case of natural gas pipes to further reduce this pressure prior to use, as is known to the expert. Here again, it is possible to use small turbines or expansion engines 10a–10e instead of pressure reducing valves, whereby the output thereof can be correspondingly reduced.

Valves and similar switching or operating elements known to the expert are not shown in this case, e.g. a valve is fitted in pipe 2 which can only be opened at peak demand times for electrical power, so that turbine 1 with generator 8 function as a peak power station. For example, in practice no less than 100,000 Nm³/h of natural gas with a pressure of e.g. 25 bar can be passed through, being reduced by turbine 1 to e.g. 10 bar in pipe 4. The constant pressure in reservoir 5 is then somewhat lower, e.g. 8 bar, whereby after passing through pipe 9 this pressure is reduced at least once more by the turbines or expansion engines 10a–10e. However, the same arrangement can be duplicated many times until the natural gas reaches load 6 with a pressure of less than 1 bar. The turbines or expansion engines 10a–10e may be interconnected by a ring main, connected with the reservoir 5 via only a single pipe in which there is only one turbine 10.

Furthermore, the turbines can be located in a known back pressure regulator system in order to maintain the pressure in delivery pipe 4 constant when there are variations to the pressure in the main pipe 3.

Due to the buffer reservoir 5 in delivery pipe 4 the possibility exists that turbine 1 only supplies completely constant quantities of current at specific times. Furthermore, the current output supply can greatly exceed that which can be generated by the maximum gas throughput determined by load or consuming device 6. Thus, the power plant provides an integration action by which the total expansion capacity over a 24 hour period can be fed at constant capacity into the load network over only a few peak consumption hours. Thus, the possibility exists of defining when and with what intake throughput the reservoir 5 is to be filled.

The possibility also exists of providing further small intermediate reservoirs in the delivery pipes 11a-11b, which naturally completely correspond to the large intermediate reservoir 5 in delivery pipe 4. Thus, the small turbines 10a-10e can be operated in the same way as large turbine 1.

In addition, the turbines or expansion engines 10a-10e can be interconnected by a pipe, connected with reservoir 5 by only one pipeline in which a single turbine 10 can be installed. Naturally, this has the advantage of installing a much larger turbine, in place of numerous small turbines 10a-10e.

In place of generator 8 for generating electric power e.g. a compressed air generator or compressor could be driven if compressed air were required.

If in the above-indicated manner, small turbines 10a-10e are combined into a single larger turbine, this also provides the possibility of arranging the latter as a further low pressure turbine 10 on the shaft of turbine 1. For this purpose, a further pipe will lead from reservoir 5 into low pressure turbine 10 parallel to pipe 4. The gas is then only supplied to loads 6 after expansion in low pressure turbine 10. To this end, a cutoff coupling must naturally be provided in shaft 7 because inter alia load 6 must be supplied via turbine 10, without it being necessary to fill reservoir 5 via turbine 1.

Figure 2:
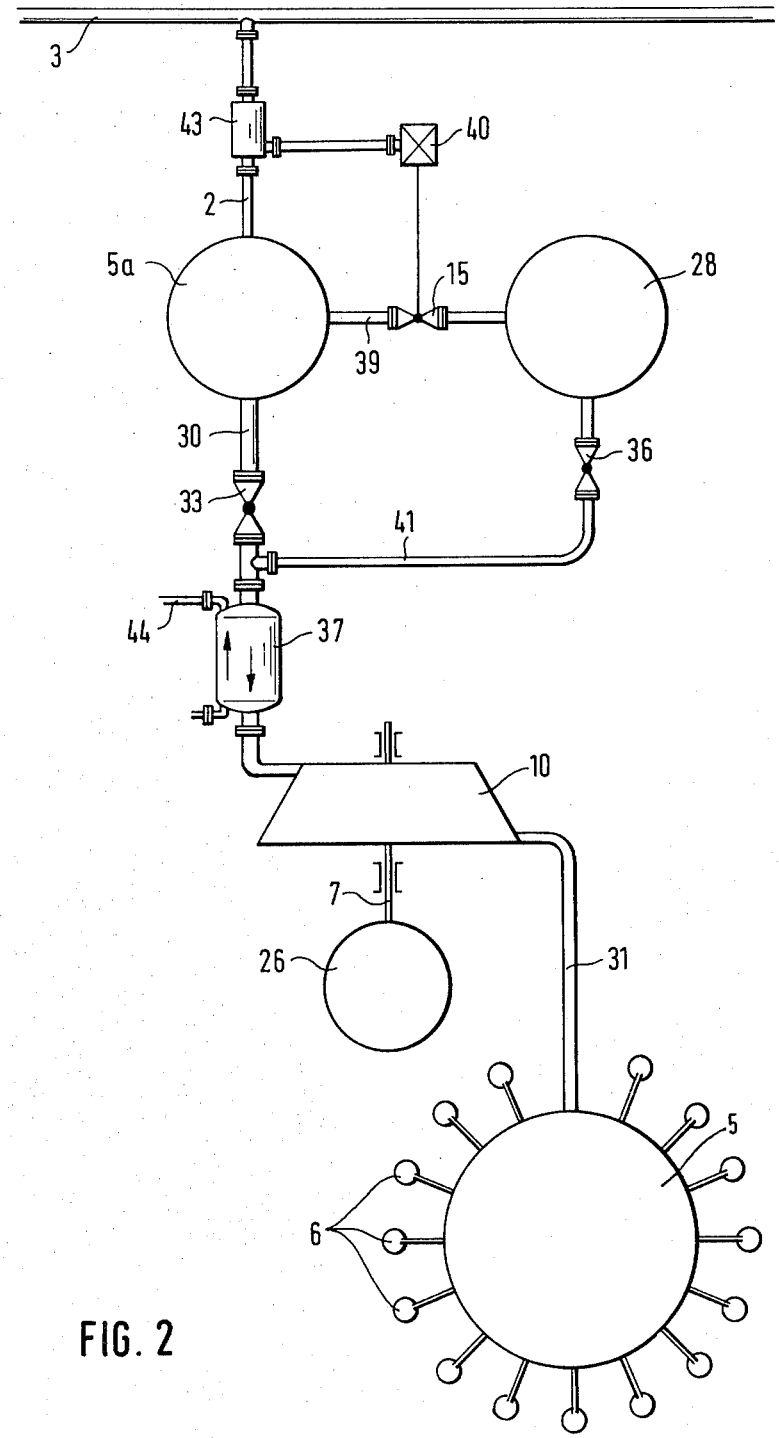
FIG. 2 shows schematically a further power plant having two intermediate reservoirs connected upstream of a turbine and one connected downstream thereof.

FIG. 2 shows an arrangement of two reservoirs 5a and 28 connected upstream of turbine 10 and a low pressure reservoir 32 connected downstream thereof.

Furthermore, pipe 30 leading from high pressure reservoir 5a can have a much larger cross-section than pipe 2 and leads via heat exchanger 37 to the single turbine 10 (with generator 26), whose output is fed into low pressure reservoir 32. The latter should have a volume such that it is at least possible to compensate the daily fluctuations in gas consumption. Numerous pipes lead from low pressure reservoir 32 to loads 6.

However, the peak consumption time can be limited to a few hours if the high pressure intermediate buffer reservoir 5a and the low pressure intermediate buffer reservoir 32 are made somewhat larger. The inflow via pipe 2 and flowmeter 43 can be made continuous. However, via valve 33 and/or valve 36, turbine 10 can be switched on only at genuine peak consumption times without pressure energy being lost and without making too high demands on main pipe 3 at said peak consumption times. In this case, the pressure energy is stored in intermediate reservoirs 5a and 28. Thus, turbine 10 can be larger than would otherwise be the case, because in the few peak power hours every day accumulator 5a can largely be emptied. Turbine 10 is equipped with a conventional speed regulation system, now shown in detail here, for driving the conventional generator 26 with a constant output in known manner. The pressure gradient can also be somewhat larger, because delivery pipe 31 must only have a back pressure which is just above the relatively low pressure of reservoir 32.

The content of long-term intermediate reservoir 28 can be supplied via valve 36 and pipe 41 to turbine 10 and low pressure reservoir 32. If reservoir 28 is a liquefied gas reservoir, the possibility exists of bringing the pressure in pipe 41 to approximately the same level as that in pipe 30. As is known, this takes place by the liquefied gas pump providing the pressure desired in pipe 41. The evaporator then ensures that the gas has approximately the same pressure. As a result, it is once again possible to use turbine 10. Valve 33 can be kept closed.

According to a further embodiment (not shown), the intermediate reservoir 5a can be omitted. Pipe 2 is then directly connected with pipe 30 and from the latter branches off pipe 39 with valve 15 and without intermediate reservoir 5a which leads to intermediate reservoir 28.

As a result, it is no longer possible to store pressure energy in intermediate reservoir 5a. However, the possibility now exists of levelling out the quantity of gas taken from the grid gas pipe 3, i.e. particularly at night additional quantities of gas can be removed via valve 15, so that a uniform removal takes place. However, it will not be possible to achieve the above-indicated ideal conditions in which the same quantities of gas are extracted from pipe 3 over the entire 24 hour period, because in practice, such large quantities are generally not required for reservoir 28. However, there can be a certain gradual adaptation, whereby the possibility also exists of feeding quantities from intermediate reservoir 28 to load 6 via valve 36 to cover the daytime peak load requirements relative to turbine 10.

In this connection, it is pointed out that a random regulating device carries out a continuous comparison between a desired value and an actual value, whereby an adaptation of the actual value to the desired value is continuously performed. In the present case, the actual value is indicated by flow-meter 43, whilst the adjustment, i.e. the adaptation takes place via control valve 15. Experience has shown that the desired value can also be selected as a function of time and fed into device 40. The expert is aware of the average past consumption and can therefore calculate future consumption. It is also possible to install a computer in regulating device 40 which permits an automatic adaptation of the desired value through calculating past consumption. Furthermore, the desired value setting means can be adjustable as a function of time, so that regulating device 40 only operates at night with a given desired value which is dependent on the time of year. Regulating devices and computers of this type are known to the expert and therefore require no detailed description.

In the case of said arrangement with oil or water pipes preferably proven rotary or piston engines are used in place of turbine 1,10.

In the case of natural gas pipes, all the known natural gas reservoirs can be used, particularly the known spherical gas reservoir. Spherical pressure reservoirs are also conventionally used for oil and water. Furthermore, said low pressure reservoirs 5, 32 can also be constructed as pressureless reservoirs, i.e. they can be liquid reservoirs. In this case, the heat exchangers 37 may be superfluous.

Advantageously, the waste heat line 44 of a power station passes through the heat exchangers 37. This leads to a considerable increase in output of the power plant and prevents unmixing of the natural gas. In particular, in the case of liquefied gas from the long-term intermediate reservoir 28 it is possible to use in advantageous manner the process of U.S. Pat. No. 3,068,659 (Marshall) for heating the gas.

Figure 3:
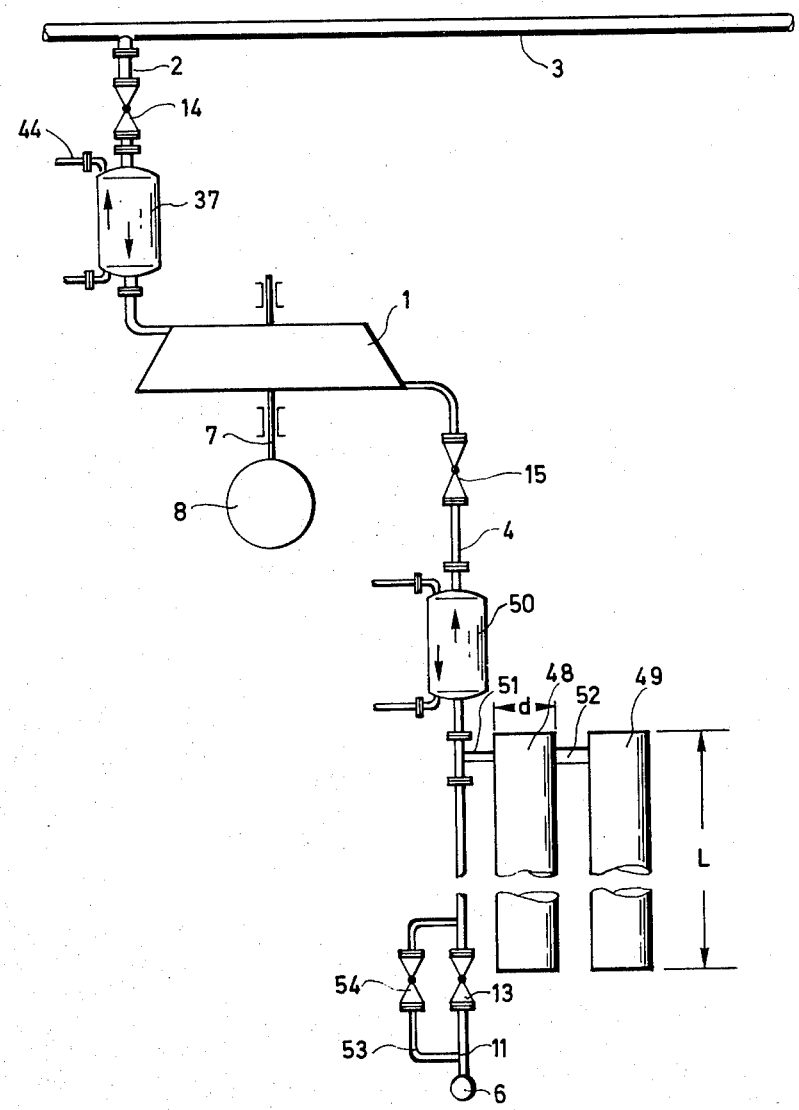
FIG. 3 shows schematically a further embodiment having an intermediate buffer reservoir formed by pipes.

In FIG. 3 there is a cooler 50 in pipe 4 and several further pipes 48, 49 parallel to each other having a larger diameter d. However, the diameter d can be the same as the one of pipe 4 if this is large enough. The length L also will be adapted to the dimension wanted in order to form an intermediate buffer reservoir having the desired capacity. Pipe 48 is connected by a short pipe 51 with pipe 4, pipe 49 with pipe 48 by the short pipe 52. Pipes 48, 49 are, of course, closed at the front and rear ends.

Pipe 4 is connected with the consuming load 6 via pressure reducing valve 13 by delivery pipe 11. There are further valves as in the foregoing embodiments in order to fill the reservoir formed by the pipes 4, 48, 49, and possibly a larger number of similar pipes. These can be used to cool the gas if the gas has been heated to a great extent by heat exchanger 37. In this case the aftercooler 50 can be omitted.

If no waste heat is available a heat pumping device known per se can be used to heat the gas in exchanger 37 using a combustion engine for driving the compressor of this device the waste heat of which can be used also to heat the gas in exchanger 37. In this way primary energy can be saved in heating the gas.

If the length L and diameter d of pipe 4 is sufficient this can be used alone to form the intermediate buffer reservoir.

In order to make sure that pressure reducing valve 13 is not working if the pressure has dropped to a certain extent a by-pass-line 53 can be arranged in which an on-off-valve 54 is opened and closed automatically when the pressure passes a certain level. Thus the valve 54 will be closed as soon as the pressure in pipe 4 has risen to for example 5 bar again. In filling the pipe 4 the pressure may go up further to 15 bar.

If the cross-section of the pipe 4 is 1 m$^2$ and the length 30 km it contains 30.000 m$^3$ natural gas of 1 bar. Under 10 bar it contains 300.000 N m$^3$. This is quite sufficient in many cases to supply the requirements of a whole night without having to fill it again.

In the case of water-pipelines the intermediate buffer reservoir can be formed by a reservoir which may be a lake for drinking water.

I claim:

1. A power plant comprising:
   (i) a pressure medium conveying main pipe
   (ii) a branch pipe connected to said main pipe
   (iii) an energy conversion device connected to receive pressure medium from said branch pipe and operable to convert pressure energy of said medium into usable energy, and
   (iv) an intermediate buffer reservoir connected to receive pressure medium from said conversion device and adapted to supply said pressure medium from said reservoir to a pressure medium consuming load.

2. A power plant, as claimed in claim 1, wherein said reservoir is connected to supply a plurality of pressure medium consuming loads.

3. A power plant, as claimed in claim 1, comprising a further energy conversion device provided between said reservoir and said load.

4. A power plant, as claimed in claim 2, comprising a respective further energy conversion device provided between said reservoir and each of said loads.

5. A power plant, as claimed in claim 1, comprising a heat exchanger disposed in said branch pipe upstream of said energy conversion device to heat pressure medium supplied through said branch pipe, said energy conversion device being an expansion turbine.

6. A power plant, as claimed in claim 5, wherein said heat exchanger is connected to receive waste heat from a power station.

7. A power plant, as claimed in claim 1, wherein said energy conversion device is a liquid pressure medium engine.

8. A power plant, as claimed in claim 3, wherein each of said energy conversion devices is a liquid pressure medium engine.

9. A power plant, as claimed in claim 8 wherein at least one of said engines is a rotary or a piston engine.

10. A power plant, as claimed in claim 7 or in claim 8, wherein said reservoir is a non-pressurized liquid reservoir.

11. A power plant, as claimed in claim 1, wherein said reservoir is constituted by at least one pipeline.

12. A power plant, as claimed in claim 11, wherein said reservoir is constituted by a plurality of pipelines arranged in parallel and connected to each other and to an outlet of said conversion device by respective other pipes.

13. A power plant, as claimed in claim 1, comprising a further intermediate buffer reservoir provided in a further pipe leading from said branch pipe via said further intermediate reservoir to said conversion device, regulating means being provided to regulate the flow from said branch pipe to said further intermediate buffer reservoir.

14. A power plant, as claimed in claim 13, wherein said regulating means is adapted to regulate such flow in dependence upon flow from said main pipe to said branch pipe.

15. A power plant, as claimed in claim 13, comprising an intermediate buffer reservoir provided in said branch pipe and connected to said conversion device and to said further intermediate buffer reservoir via a control valve of said regulating means.

* * * * *